United States Patent [19]

Schreurs et al.

[11] 4,214,068
[45] Jul. 22, 1980

[54] ESTERS CONTAINING PHENOLIC GROUPS AS EPOXY RESIN CURING AGENTS

[75] Inventors: Gerardus C. M. Schreurs; Werner Th. Raudenbusch; Theodorus N. Visser, all of Amsterdam, Netherlands

[73] Assignee: Shell Oil Company, Houston, Tex.

[21] Appl. No.: 37,609

[22] Filed: May 10, 1979

[30] Foreign Application Priority Data

May 22, 1978 [GB] United Kingdom ............ 21051/78

[51] Int. Cl.² ............................................. C08G 59/62
[52] U.S. Cl. ................................. 528/98; 260/18 EP; 428/185; 560/85; 560/193; 560/194; 528/100
[58] Field of Search ............ 260/18 EP; 560/85, 193, 560/194; 528/98, 100

[56] References Cited

U.S. PATENT DOCUMENTS

| | | | |
|---|---|---|---|
| 2,934,521 | 4/1960 | Masters et al. | 260/47 |
| 3,301,920 | 1/1967 | Price | 260/837 |
| 3,316,277 | 4/1967 | Frank et al. | 260/348 |
| 3,329,652 | 7/1967 | Christie | 260/47 |
| 3,418,333 | 12/1968 | Warren | 260/309 |
| 3,477,990 | 11/1969 | Dante et al. | 260/47 |
| 3,931,109 | 1/1976 | Martin | 260/47 EP |
| 4,101,518 | 7/1978 | Takamori et al. | 528/100 |
| 4,151,305 | 4/1979 | Davis et al. | 426/131 |

FOREIGN PATENT DOCUMENTS 1339377 12/1973 United Kingdom.

*Primary Examiner*—Earl A. Nielsen

[57] ABSTRACT

Phenolic curing agents, especially suitable for use in powder coatings, are prepared by reacting a dihydric phenol (diphenylol propane), a diepoxide (liquid diglycidyl ether of diphenylol propane), and a dicarboxylic acid (adipic acid) with the phenolic functionality in excess over the difference between the epoxy functionality and the acid functionality.

9 Claims, No Drawings

ESTERS CONTAINING PHENOLIC GROUPS AS EPOXY RESIN CURING AGENTS

BACKGROUND OF THE INVENTION

Powder coating, in particular with epoxy resins, is a well known technique. Simply, a pulverulent mixture containing resin, curing agent and other components is applied to a substrate, resin and curing agent melt by heating to temperatures usually higher than 150° C., flow out to form a coherent layer, and react to harden the coating. Curing agents for this application should be latent, that is non-reactive at room temperature, and fully reactive above about 150° C. For many uses amine-type curing agents, for example, based on dicyandiamide, have given excellent results; however, such coatings have a tendency to yellowing when stored for a prolonged time at temperatures of 180°-200° C.

British Pat. No. 1,399,377 discloses the use of certain phenolic compounds as cross-linking or curing agents in epoxy resin powder compositions; the phenolic compounds are simple dihydric phenols such as (Bisphenol A), 2,2-bis(4-hydroxyphenyl)propane, or resinous adducts prepared by reacting a diglycidylether of Bisphenol A with an excess of dihydric phenol at 150° C., optionally in the presence of a catalyst, for such a time that the cooled product is pulverizable and suitable for use as a cross-linking agent. The phenolic compounds are then mixed with the solid epoxy resins in a ratio of from about 0.8 to 1.1 phenolic hydroxyl groups per epoxy group; the powder coating compositions may also contain other usual additives for thermosetting coating compositions, such as curing catalysts, pigments, flow control agents, antistatic agents, etc. The epoxy resin components of the powder were copolymers of glycidyl methacrylate, and calculation shows that the copolymers as described contain in general more than two epoxy groups per molecule.

Phenolic adducts of this type and their use as curing agents for epoxy resins have also been disclosed in U.S. Pat. No. 3,931,109, wherein it is recommended to use the phenolic adducts from dihydric phenols and diepoxides in combination with epoxy resins which have an epoxy functionality greater than 2.

However, the majority of epoxy resins, in particular for powder coatings, are diglycidyl ethers of dihydric phenols, and use of a dihydric curing agent may require excessive cure schedules to effect sufficient cross-linking and solvent resistence.

Novel phenolic compounds have now been found in which this drawback has been avoided, wherein the residue of a dicarboxylic acid is incorporated in the structure of the phenolic adduct.

SUMMARY OF THE INVENTION

The invention relates to novel phenolic compounds, their preparation, and their use as curing agents for epoxy resins. In particular the novel compounds are suitable curing agents in epoxy resin powder compositions, such as molding powders and coating powders.

DESCRIPTION OF THE PREFERRED EMBODIMENT

The present invention is directed to the preparation of phenolic compounds which are suitable as curing agents for epoxy resins, and which are characterized by the formula

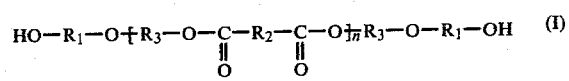

wherein
n is a number having an average value of from 0.25 to 4, preferably from about 0.30 to about 2, $R_1$ is the hydrocarbon residue of a dihydric phenol, $R_2$ is the hydrocarbon residue of a dicarboxylic acid, $R_3$ is a divalent group having the formula

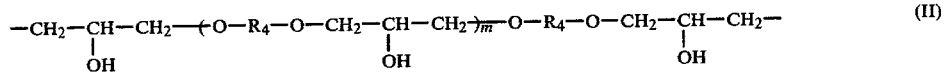

wherein m is a number having an average value of from 0 to 4, preferably from 0 to 2, $R_4$ is the hydrocarbon residue of a dihydric phenol.

$R_4$ may be the same hydrocarbon residue as $R_1$, or it may be different.

The phenolic compounds according to the invention can be further conveniently described by the process for their preparation, which is characterized in that a dihydric phenol having the formula $HO-R_1-OH$, a diepoxide having the formula

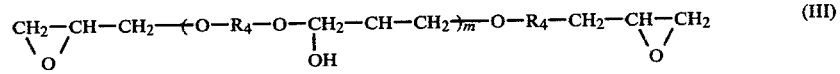

and a dicarboxylic acid having the formula

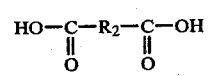

wherein $R_1$, $R_2$, $R_4$ and m have the same meaning as in formula (I), are reacted in the molar ratio of dihydric phenol:diepoxide:dicarboxylic acid of $\geq 2:(n+1):n$, in the presence of a catalyst at a temperature of from 130° C. to 160° C.

In general, the components are reacted in such molar ratios that the phenolic functionality is in excess over the difference between the epoxy functionality and the acid functionality.

The dihydric phenol $HO-R_1-OH$ may have one or two aromatic six-membered carbon rings per molecule. In general, any dihydric phenol may be utilized.

Preferred phenols to be used are the polyhydric phenols containing from 2 to 6 OH groups and up to 30 carbon atoms. Coming under special consideration are the phenols of the formula

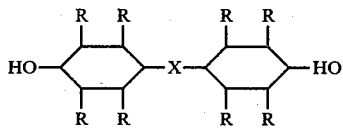

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as

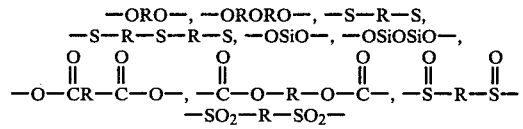

radicals wherein R is a bivalent hydrocarbon radical.

Other preferred phenols are described in U.S. Pat. No. 3,477,990.

Especially preferred phenols include resorcinol, hydroquinone, bisphenol F (diphenylol methane), bisphenol A and diphenylol sulfone, with bisphenol A being the most preferred. In the dicarboxylic acid

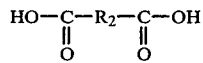

the group —R$_2$— is preferably a divalent aliphatic or cycloaliphatic C$_2$ to C$_{34}$, more preferably a C$_2$ to C$_{10}$ hydrocarbon group; most preferably R$_2$ is the group —(CH$_2$)$_4$—. Preferred examples are the saturated aliphatic dicarboxylic acids: succinic acid, glutaric acid, adipic acid, pimelic acid, suberic acid, azelaic acid, sebacic acid, and decane dicarboxylic acid, with adipic acid being most preferred for the preparation of phenolic compounds for epoxy resin coating powders. Another example of a dicarboxylic acid is dimerized unsaturated fatty acid.

Diepoxides of formula (III) are diglycidyl ethers of dihydric phenols such as the bisphenols A and F and mixtures thereof; in particular the diglycidyl ethers of bisphenol A are preferred, as they are well-known commercial products, which have no contaminant epoxy functionality greater than two which might cause gelation. Due to the method of manufacture, the diglycidyl ethers may contain a small amount of ethers wherein a glycidyl group has been hydrolyzed to give a glyceryl ether component. To compensate for this, for calculations, the molar weights of the diepoxides are considered to be twice the value of the epoxy molar mass.

Preferred diepoxides are diglycidyl ethers of bisphenol A with an epoxy molar mass of from 170–190 (m=0), 225–280 (m=0.5) or 450–500 (m=2).

Diepoxides of formula (III) wherein m has an average value of from 0 to 1 and R$_4$ is the hydrocarbon residue of bisphenol A are particularly preferred with a view to the properties of the resulting phenolic product.

A catalyst is added to promote additional reactions of epoxy with carboxyl and phenolic hydroxyl and to avoid excessive branching by reaction of epoxy with secondary hydroxyl groups formed; excessive branching may result in gelation. Suitable catalysts are, in general, from the classes of tertiary amines and imidazoles of low volatility and their salts, tertiary phosphines, quaternary ammonium salts, quaternary phosphonium salts, non-volatile mercapto compounds, and metal compounds, such as derivatives of Li, Sn and Al, which are known catalysts for reactions with epoxides.

Preferred tertiary phosphines and phosphonium salts are described in U.S. Pat. No. 3,477,990, and so much of the disclosure relevant to the preparation and description of such compounds are incorporated herein by reference.

Suitable metal compounds include the stannous and lithium salts of carboxylic acids, particularly, the monocarboxylic acids having up to about 12 carbon atoms. Examples include, among others, stannous octoate, stannous naphthenate, lithium benzoate, etc.

Suitable imidazole compounds are described in U.S. Pat. Nos. 3,418,333 and 3,329,652, among a multitude of other patents. Accordingly, the disclosure relevant to suitable imidazole compounds in U.S. Pat. Nos. 3,418,333 and 3,329,652, is herein incorporated by reference.

Preferred catalysts are tertiary amines, in particular 1,6-bis(dimethylamino)hexane, 1,8-diazabicyclo[5.4.0]undecene-7 (abbreviated DBU), benzyldimethylamine, and quaternary ammonium salts, in particular tetra-alkylammonium salts with C$_1$ to C$_4$ alkyl groups, for example tetramethyl-ammonium chloride and tetraethylammonium chloride; one of the alkyl groups may be substituted by an aryl group, such as benzyl trimethyl ammonium chloride. The amount of catalyst may vary from 0.02 to 0.5 percent by weight of the reaction mixture. One or more catalysts may be used, and the catalyst or catalysts may be added in one or in several successive portions.

The molar ratios of the components dihydric phenol, diepoxide, and dicarboxylic acid are in general $\geq 2:(n+1):n$; for values of n from 1 to 4 they can, for example, be in ratios in a range from 1.5:2:1 to 4:2:1, and for values of n from 0.3 to 1, a preferred ratio is 2:1.4:0.4; in the ratio of diepoxide and dicarboxylic acid deviations of ±10% of these values are considered allowable. The amount of dihydric phenol is so chosen that this component is in excess, to ensure that the final adduct will be phenolic hydroxyl terminated. Usually the final product will contain some free dihydric phenol, which will also act as a curing component.

The value of n is an average value, and the phenolic compounds according to the invention will usually be mixtures of various components.

The reactants (dihydric phenol, diepoxide, and dicarboxylic acid) may be mixed with gentle heating, and the catalyst added at the point when the addition reactions can be expected to start (80°–130° C.). The catalyst may also be added before the heating is started. The additional reactions are exothermic, but can be quite easily kept under control by suitable means of heating and cooling. Two stages are usually discernible during the preparation: the first stage is predominantly an exothermic reaction of the dicarboxylic acid and the diepoxide, giving epoxy-terminated adducts, with decrease of the acid content to a very low value, and thereafter the dihydric phenol begins to react with the epoxides present, again with evolution of heat. The mixture can then be kept for some time at say 160° C. to finalize the reactions, and cooled. Solid phenolic compounds for use in thermosetting resin powders may then be pulverized. Gradual addition of one of the components (for example, the dihydric phenol) can be visualized, but has no particular advantage. Solvents may be present during the preparation of the adduct, as for example, when a adduct of this type is intended as curing agent in a solvent-borne paint.

For use in powder compositions the preferred dihydric phenol and dicarboxylic acids are bisphenol A and adipic acid, respectively, and the diepoxide is preferably a liquid diglycidyl ether of bisphenol A (epoxy equivalent weight 170–280), to obtain an adduct having a melting point of at least 60° C.

The phenolic compounds according to the invention can be used as latent curing agents for epoxy resins for a variety of applications, such as molding, potting, casting, and, in particular, for coating purposes.

The invention therefore relates further to an epoxy resin composition, curable at elevated temperature, comprising a polyepoxide and a phenolic compound as hereinbefore defined as the phenolic curing agent. The amount of phenolic compound is then preferably such as to provide from 0.8 to 1.2, more preferably from 0.9 to 1.1, phenolic hydroxyl group per epoxy group. Values for each of these criteria can be determined by analysis. Usually a catalyst is added to accelerate the cure. Other additives may be added as well, such as pigments, fillers, flow control agents, antistatic agents, anticratering agents, plasticizers, diluents, solvents, etc.

Phenolic compounds according to the invention are very suitable curing agents in epoxy resin powder compositions, for molding and, in particular, for coating purposes.

The invention relates therefore further to a pulverulent, heat-curable coating composition, comprising a normally solid polyepoxide, and a phenolic compound as hereinbefore defined, which is normally solid. Normally solid in this connection means that the component concerned will have a softening point of at least 60° C.

The polyepoxide in the pulverulent composition is preferably a polyglycidyl either of bisphenol A which is solid at room temperature, and has a softening point in the range of from 60° to 140° C., preferably from 80° to 110° C.

Suitable compounds for use as accelerator in epoxy resin compositions which contain the present phenolic compounds include all of the well-known epoxy accelerators such as the tertiary amines and their salts, quaternary ammonium salts, quaternary phosphonium salts, imidazoles, imidazolines, and mercapto compounds. Very suitable curing accelerators are 1,8-diaza bicyclo[5.4.0]-undecene-7,2-methyl imidazole, and in particular 1,6-bis-(dimethylamino)hexane. The latter is particularly useful in pulverulent coating compositions.

These curing accelerators can generally be used in amounts of from 0.2 to 2 weight percent based on the combined weight of polyepoxide and curing agent. The right amount will depend on the activity of the accelerator and the desired speeding-up of cure. The accelerator can be mixed with the other components (resin, curing agent, other ingredients) while making the powder composition, but is preferably dissolved in the molten curing agent directly after the latter's preparation: this is a convenient way to ensure homogeneous distribution of the rather small amount of accelerator.

The curing accelerator may be the same compound as that used to catalyze the formation of the phenolic compound, or it may be a different compound. For example when a quaternary ammonium salt has been used as a catalyst for the preparation of the phenolic compound, the accelerator for a powder composition may be a tertiary amine such as 1,6-bis(dimethylamino)hexane or 1,8-diaza bicyclo[5.4.0]-undecene-7, or an imidazole such as 2-methyl imidazole.

The powder compositions may be dry-blended, mill-blended, or fusion-blended, all as known in the art; in the fusion-blending technique the ingredients are blended in a heated Z-blade mixer, on hot rolls, or in an extruder; extruders have the advantage of very short blending times, therefore they can be used for making large quantities of formulations which are difficult to compound in a Z-blade mixer.

The cooled solid material can then be ground (for example, in a pin disk mill) and sieved to obtain a powder of the desired particle size, as, for example, passing 45 mesh ASTM for use in an electrostatic fluidized bed; or less than 200 mesh ASTM for electrostatic spraying.

Articles, for example, metal articles, can be coated with a layer of powder by one of the methods outlined above, and the layer can be baked at the desired temperature, for example in the range of from 140° C. to 180° C., to form a homogeneous baked coating on the article. Coating powders with the present phenolic curing agents have a number of advantages over earlier coating powders:

(1) complete cure at stoving temperatures as low as 140°–150° C. within a very reasonable time, for example, 15 minutes;

(2) in spite of the high reactivity at 140° C., the powders have excellent physical and chemical storage stability;

(3) excellent mechanical and chemical film properties, including solvent resistance, of the cured coating;

(4) conventional epoxy resins can be used for manufacture of the powders;

(5) white pigmented powders have low tendence for yellowing at overbake, that means improved color stability at high baking temperatures (180°–200° C.) during prolonged time.

To illustrate the manner in which the invention may be carried out, the following illustrative examples are given. It is to be understood, however, that the examples are for the purpose of illustration and the invention is not to be regarded as limited to any of the specific materials or conditions recited therein. Unless otherwise indicated, parts and percentages are by weight.

The polyepoxides had the following properties:

(1) Diepoxide used for preparation of the phenolic compound: (Polyether A), a commercial liquid diglycidyl ether of bisphenol A, having epoxy equivalent weight 186, molecular weight used for calculations: 372 (2 epoxy equivalents).

(2) Polyepoxide used for preparation of the powders: (Polyether E), a polyglycidyl ether of bisphenol A, having epoxy equivalent weight 965 and melting at 98° C.

EXAMPLE 1

This example illustrates the preparation of the phenolic compound according to the present method.

A mixture of Polyether A (744 g; 2 moles), bisphenol A (456 g; 2 moles) and adipic acid (146 g; 1 mole) was heated to 70° C. with stirring. Tetramethyl ammonium chloride (0.54 g; 0.04% w) was added, and the temperature was raised further. At 130° C. an exothermic reaction started; the temperature was allowed to rise to 140° C. with slight cooling, and kept at 140° C. during 1 hour. The acid content had then dropped to 2 meq/100 g so nearly all adipic acid had been consumed. A second exothermic reaction began (reaction epoxy/phenolic hydroxy) and increased the mass temperature to 160° C. The molten mass was kept at 160° C. during 2 hours, then discharged and allowed to cool. The clear brittle product had acid content 1.0 meq/100 g, epoxy content 3.5 meq/100 g, and phenolic hydroxyl content 230 meq/100 g; melting range 75°–90° C.

EXAMPLE 2

Example 1 was repeated, but after completed reaction (epoxy content 3.0 meq/100 g) and cooling to 140° C., 1,6-bis(dimethylamino)hexane (34.5 g) was added, to serve as accelerator for use of the product as curing agent in epoxy resin powder coating formulations. The mass was stirred for 15 minutes at 140° C. and then discharged and allowed to cool.

EXAMPLE 3

Example 1 was repeated, but with the following amounts:
Polyether A (744 g; 2 moles)
Bisphenol A (684 g; 3 moles)
Adipic acid (146 g; 1 mole)
Tetramethyl ammonium chloride (0.63 g)
The analytical data for the product were:
epoxy content: 3.2 meq/100 g
acid content: 0.7 meq/100 g
phenolic hydroxyl content: 350 meq/100 g
melting range: 65°–85° C.

EXAMPLE 4

Example 1 was repeated, with the exception that the tetramethyl ammonium chloride was replaced by 1,8-diaza-bicyclo[5.4.0]undecene-7 (2.7 g; 0.2% w). Product properties were essentially the same.

EXAMPLE 5

Example 1 was repeated with the exception that the adipic acid was replaced by decane, 1,10-dicarboxylic acid (230 g; 1 mole). The product was a brittle solid having the analytical data:
epoxy content: 3.0 meq/100 g
acid content: >1 meq/100 g
phenolic hydroxyl content: 200 meq/100 g
melting range: 60°–80° C.

EXAMPLE 6

Example 1 was repeated, with the exception that the adipic acid was replaced by a commercial dimerized fatty acid (575 g; 1 mole). The product was a slightly tacky solid; analytical data:
epoxy content: 3 meq/100 g
acid content: <1 meq/100 g
phenolic hydroxyl content: 175 meq/100 g
The product was used as the curing agent in a high solids stoving lacquer, in combination with Polyether A.

EXAMPLE 7

Example 1 was repeated using the following quantities of reactants: Polyether A (520.8 g; 1.4 moles), bisphenol A (456 g; 2.0 moles), adipic acid (58.4 g; 0.4 moles), tetramethylammoniumchloride (0.50 g).
The product, a brittle solid, had the analytical data:
epoxy content: 2.9 meq/100 g
acid content: <1 meq/100 g
phenolic hydroxyl content: 275 meq/100 g
melting range: 75°–90° C.

EXAMPLE 8

White powder coating formulations were prepared according to the following general procedure (for materials and quantities, see Table I): Epoxy resin (Polyether E) and curing agent were coarsely ground (particle size about 2 mm) and dry blended with the pigment, accelerator (as a 10% w masterbatch in the curing agent, except at C) and flow control agent (as a 10% w masterbatch in the epoxy resin). The blend was homogenized by extrusion in an extruder (Buss Ko-Kneader PR-46) with the following conditions:
barrel temperature: 94° C.
screw temperature: 40° C.
extrudate temperature: 100°–102° C.
screw speed: 40 r.p.m.
The extrudate was allowed to cool to room temperature, powdered and sieved to a particle size 75 micrometers. The powders were applied by electrostatic spraying onto cold rolled steep panels (coatings 55–60 micrometers thick). The panels were stoved as specified in Table I. The flow was good, and the coatings were glossy. For detailed evaluation see Table I.

Table I

| Composition | A | B | C | D | E |
|---|---|---|---|---|---|
| Composition and properties of powder coatings | | | | | |
| Polyether E (g) | 1000 | | 1000 | 1000 | 1000 |
| Curing agent of Eample | 1 | | 2 | 3 | 7 |
| Curing agent amount (5) | 550 | | 514 | 336 | 423 |
| Accelerator type* | BDMAH | as A | BDMAH | DBU | as A |
| Accelerator amount (g) | 10.9 | | — | 9.4 | 10.7 |
| Modaflow (flow control agent) (g) | 7.7 | | 7.5 | 7.0 | 7.5 |
| Titanium dioxide | 775 | | 752 | 670 | 712 |
| Stoving conditions (°C./min) | 140/15 | 150/15 | 140/15 | 150/15 | 140/15 |
| Coating properties | | | | | |
| Hardness (Konig, s) | 211 | 213 | 217 | 210 | 224 |
| Adhesion (Gitterschnitt) | Gto | Gto | Gto | Gto | Gto |
| Erichsen Slow Penetration (mm) | 7.8 | 8.2 | 8.0 | 8.3 | 8 |
| Ford Impact, Reverse (kg.cm) | 22 | 90 | 90 | 11 | 90 |
| Xylene immersion+ | | | | | |

Table I-continued

| Composition | Composition and properties of powder coatings | | | | |
|---|---|---|---|---|---|
| | A | B | C | D | E |
| (15 min/22°C.) | 9 | 10 | 10 | 9–10 | 10 |
| MIBK immersion+ | | | | | |
| 5 min/22° C.) | 8 | 9 | 9 | 9 | 9 |
| 5% aq.NaoH+ | | | | | |
| (7 days/22° C. | 10 | 10 | 10 | 9–10 | 10 |
| Whiteness (Stephanson) | 87.2 | 87.2 | 82.8 | 85.1 | 87.3 |
| Whiteness (after overbake) | | | | | |
| (200° C./15 min) | 84.9 | 85.3 | 82.9 | 84.4 | 85.0 |
| Yellowing | | | | | |
| (whiteness) | 2.3 | 1.9 | −0.1 | 0.7 | 2.3 |
| Powder storage stability++ | | | | | |
| (7 days/40° C.) | n.b. | n.b. | n.b. | n.b. | n.b. |

*BDMAH: 1,6-Bis (dimethylamino) hexane
DBU: 1,8-Diazabiyclo [5.4.0]undecene - 7
+10: unaffected, 9: very sight affected, 8: somewhat softened
++n.b.: not blocked (powder still free flowing)

What is claimed is:

1. A phenolic compound, suitable as a curing agent for epoxy resins, having the generalized formula:

$$HO-R_1-O+R_3-O-\underset{\underset{O}{\|}}{C}-R_2-\underset{\underset{O}{\|}}{C}-O\underset{n}{\rbrack}-R_3-O-R_1-OH$$

wherein n is a number having an average value of from 0.3 to 4, $R_1$ is the hydrocarbon residue of a dihydric phenol, $R_2$ is the hydrocarbon residue of a dicarboxylic acid, and $R_3$ is a divalent group having a formula:

$$-CH_2-\underset{\underset{OH}{|}}{CH}-CH_2+O-R_4-O-CH_2-\underset{\underset{OH}{|}}{CH}-CH_2\underset{m}{\rbrack}-O-$$
$$-R_4-O-CH_2-\underset{\underset{OH}{|}}{CH}-CH_2-$$

wherein m is a number having an average value of from 0 to 4, and $R_4$ is the hydrocarbon residue of a dihydric phenol.

2. The phenolic compound of claim 1 wherein n has an average value of from 1 to 4.

3. The phenolic compound of claim 1 wherein $R_2$ is the divalent group $-(CH_2)_4-$.

4. A pulverulent heat-curable coating composition, comprising a normally solid polyepoxide, and the normally solid phenolic compound curing agent of claim 1.

5. The pulverulent heat-curable composition of claim 4, which additionally contains 1,6-bis(dimethylamino)-hexane as a curing accelerator.

6. A process for the preparation of the phenolic compound of claim 1 wherein a dihydric phenol having the formula $HO-R_1-OH$, a diepoxide having the formula:

$$CH_2-CH-CH_2+O-R_4-O-CH_2-\underset{\underset{OH}{|}}{CH}-CH_2\underset{m}{\rbrack}-O-$$
$$\underset{O}{\diagdown\diagup}$$
$$-R_4-CH_2-CH-CH_2$$
$$\underset{O}{\diagdown\diagup}$$

and a dicarboxylic acid having the formula:

$$HO-\underset{\underset{O}{\|}}{C}-R_2-\underset{\underset{O}{\|}}{C}-OH$$

are reacted in the molar ratio of dihydric phenol:-diepoxide:dicarboxylic acid of <2:(n+1):n, in the presence of a suitable catalyst at a temperature of from about 130° to about 160° C.

7. The process of claim 6 wherein the dicarboxylic acid is adipic acid.

8. The process of claim 6 wherein the dihydric phenol is 2,2-bis(4-hydroxyphenyl)propane.

9. The process of claim 6 wherein the diepoxide is a diglycidyl ether of 2,2-bis(4-hydroxyphenyl)propane.

* * * * *